(12) United States Patent
Varma et al.

(10) Patent No.: US 10,217,130 B1
(45) Date of Patent: Feb. 26, 2019

(54) EVENT INFORMATION DETERMINATION

(71) Applicant: SQUARE, INC., San Francisco, CA (US)

(72) Inventors: Ajit Varma, San Francisco, CA (US); Jack Dorsey, San Francisco, CA (US); Jesse Reiss, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 456 days.

(21) Appl. No.: 14/092,724

(22) Filed: Nov. 27, 2013

Related U.S. Application Data

(60) Provisional application No. 61/730,431, filed on Nov. 27, 2012.

(51) Int. Cl.
*G06Q 30/02* (2012.01)

(52) U.S. Cl.
CPC ..... *G06Q 30/0252* (2013.01); *G06Q 30/0259* (2013.01)

(58) Field of Classification Search
None
See application file for complete search history.

(56) References Cited

U.S. PATENT DOCUMENTS

| | | | |
|---|---|---|---|
| 6,975,959 B2 | 12/2005 | Dietrich et al. | |
| 8,719,094 B1 * | 5/2014 | Klein | G01C 21/3697 705/14.25 |
| 9,607,318 B1 * | 3/2017 | Gerchikov | G06Q 30/0259 |
| 10,013,136 B2 * | 7/2018 | Bachman | G06F 3/0481 |
| 2003/0050854 A1 | 3/2003 | Showghi et al. | |
| 2005/0022139 A1 | 1/2005 | Gettman et al. | |
| 2006/0206381 A1 | 9/2006 | Frayman | |
| 2011/0181443 A1 * | 7/2011 | Gutierrez | G01C 21/3691 340/990 |
| 2011/0276396 A1 | 11/2011 | Rathod | |
| 2011/0302029 A1 | 12/2011 | Harmon | |
| 2012/0259842 A1 * | 10/2012 | Oman | G06Q 10/1093 707/722 |
| 2013/0046635 A1 * | 2/2013 | Grigg | G06Q 30/0238 705/14.58 |
| 2017/0200198 A1 * | 7/2017 | Grucci | H04W 4/02 |

OTHER PUBLICATIONS

Nader Mohamed and Jameela Al-Jaroodi ; Temporal Web Alerts ; Publication Date: Apr. 1, 2010; Published in: 2010 Seventh International Conference on Information Technology: New Generations (pp. 637-641) (Year: 2010).*

* cited by examiner

*Primary Examiner* — William A Brandenburg
*Assistant Examiner* — Rashida R Shorter
(74) *Attorney, Agent, or Firm* — Polsinelli PC-Square

(57) ABSTRACT

Systems and methods are provided for determining the presence of a location-based event by receiving information from one or more sellers. The information may include seller location and/or types of items sold. The type of event may be determined. Optionally, a guide for the event can be generated based on the information received from the sellers. Information about the event and/or the guide may be accessed by a mobile device of a potential buyer or via a web directory.

28 Claims, 6 Drawing Sheets

EVENT INFORMATION DETERMINATION

CROSS-REFERENCE

This application claims priority to U.S. Provisional Patent Application Ser. No. 61/730,431 filed on Nov. 27, 2012, which is entirely incorporated herein by reference.

BACKGROUND

Throughout the world, location-based events, such as farmers markets, food truck gatherings, fairs, conventions, concerts, music events, malls, garage sales, flea markets, charity events, or tradeshows have been a cost-effective way of generating opportunities for buyers and sellers to get together. However, oftentimes, as such events are not necessarily permanently established, potential buyers may often not be aware of such events. Also, sometimes, events occur on an ad hoc basis, without opportunity to publicize the event. This may result in lost opportunities for both sellers and buyers.

Despite the existence of such events, and some advertising that may occur ahead of time, buyers who have not been exposed to the advertising may be unaware of such events, even if the buyers are close by.

Additionally, oftentimes such events lack event guides that are readily accessible to attendees. Even if guides are provided, they require pre-registration and extra steps or logistics for the participants. Such guides are often limited in the information they convey. Furthermore, the guides may have out of date information. Such guides may only show information as conveyed during pre-registration.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the claimed invention are set forth with particularity in the appended claims. A better understanding of the features and advantages will be obtained by reference to the following detailed description that sets forth illustrative embodiments, and the accompanying drawings or figures (also "FIG." or "FIGs." herein) of which:

DETAILED DESCRIPTION

Figure 1:
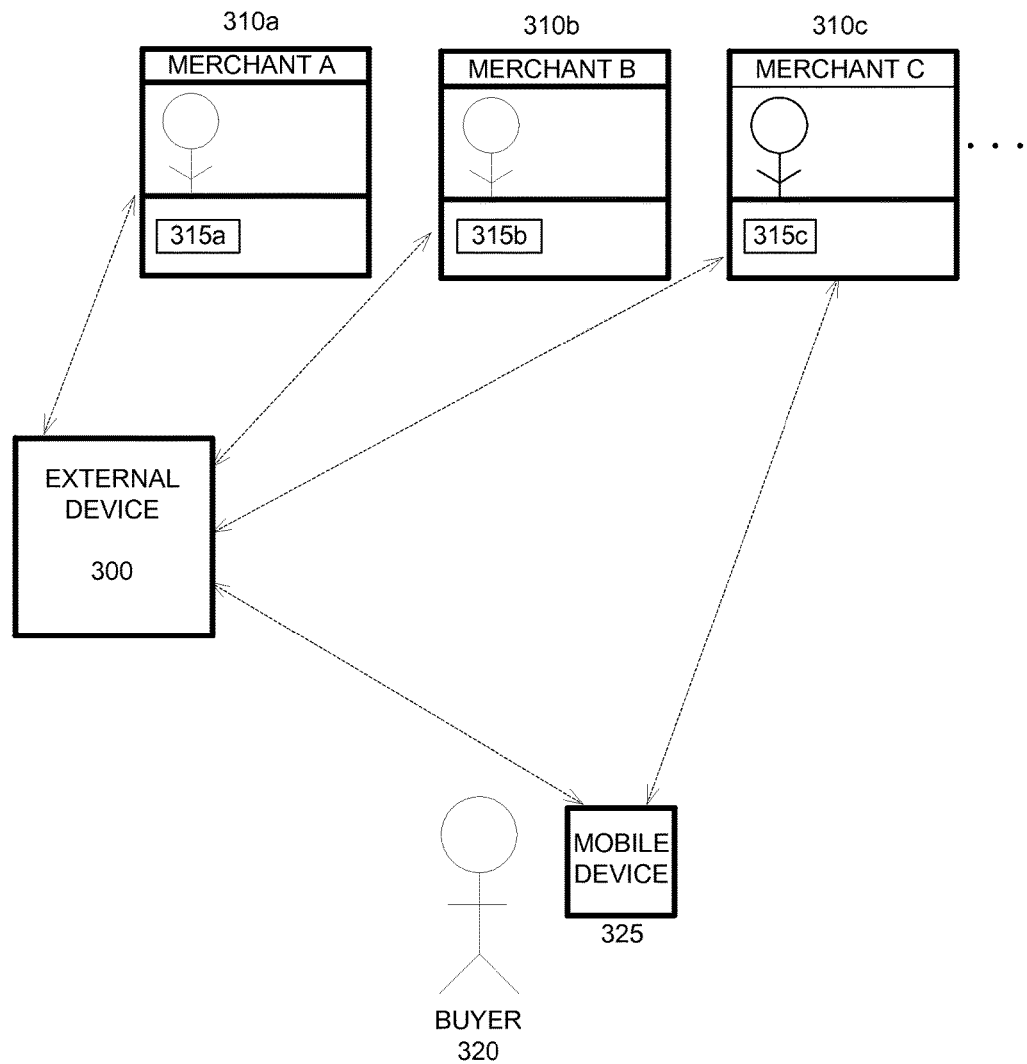
FIG. 1 provides an illustration of communication between devices in an event determination system in accordance with an embodiment of the invention.

Merchants may gather for event, such as a farmer's market, food truck gathering, trade show, conversion, carnival, fair, or other events where the merchants are located near one another. These location-based events may be planned or may occur on an ad hoc basis. Oftentimes, potential buyers may not be aware of the presence of the events. A need exists to identity when such events are occurring and inform potential buyers about the events.

Merchants at the event may have devices, such as payment registers, that can provide information about the merchants' locations and the transactions that are occurring. Based on density or clustering of merchants at a particular location, an event may be detected. For example, a farmer's market may have many booths with different merchants in a relatively small location. Information about the transactions themselves, such as the items being sold may also suggest that an event is taking place. For example, if a common type of item is sold (e.g., produce), then the type of event may be identified (e.g., farmer's market). Based on the gathered information from the payment registers, it may be determined whether a location-based event is taking place.

Potential buyers who may be interested in the event may be informed. For example, a buyer may have a device, such as a smartphone. The smartphone may receive an alert when the buyer is near the detected event (e.g., if the buyer is within half a mile of the farmer's market). The buyer may also be informed of the event, if the buyer has made past purchases that show an interest in the type of event occurring. For example, if the buyer has often bought items for her pet, the buyer may be informed of a pet convention occurring in her area.

An event guide may be generated to help guide a buyer through the event. The guide may include information about the participating merchants, such as the names of the merchants and types of items they are selling. The guide may also include a map of the event, such as where the merchant booths are located relative to one another at a farmer's market. The guide may also show a buyer the buyer's location to assist the buyer in navigating the event.

The term "merchant," as used herein, generally refers to an individual, business or other entity, the occupation of which is the sale of goods for profit or, alternatively, trade of an item of value for another item of value. In an example, a merchant is a retail business or a shopkeeper. A merchant may be an online business or entity offering a product or service for profit of trade. Examples of merchants include, without limitation, food stores, grocery stores, electronic stores, department stores, bars, clubs, restaurants, mobile merchants (e.g., food trucks or other trucks, food stands/booths or other stands/booths, tables, displays) and bookstores. Any description of "seller" may also refer to a merchant and vice versa.

The term "buyer," as used herein, generally refers to an individual or entity that uses systems and methods of the disclosure. A description of a buyer may apply to a user of the system. A buyer can be an individual or entity that wishes to purchase a product or service of a merchant, or may be potentially interested in purchasing a product or service of a merchant. A buyer can be a payer. In some situations, a buyer may be a consumer, purchaser, event attendee, or event participant.

In one aspect, systems and methods use information about merchants to determine the presence of a location-based event. Various aspects described herein can be applied to any of the particular applications set forth below, alone or in combination, or for any other types of event tracking or updating system. The embodiments described herein may be applied as a standalone system or method, or as part of an integrated consumer side and merchant side information handling system. It shall be understood that different aspects can be appreciated individually, collectively, or in combination with each other.

A transaction system can be provided at a point of sale, such as a merchant location. The merchant may have a transaction device, such as a payment register, at the merchant location. The merchant may be participating in a location-based event. A buyer can purchase goods and/or services at the point of sale. In some embodiments, the merchant is a part of the transaction system that is capable of accessing user account information to facilitate a financial transaction. The transaction system can also have access to merchant information (e.g., locations, transactions, inventory). For example, if the buyer uses the system, the merchant can access the buyer's user information to permit the financial transaction. In some instances, the buyer's account includes payment card information (e.g., credit/debit card number, expiration date, security code, cardholder name, etc.), which can be provided to the merchant during a financial transaction. The payment card information can be provided to the merchant without requiring the presence of the physical payment card. For instance, the buyer can have the physical payment card in his or her wallet, or does not have the physical payment card on his or her person, but the payment card information can be pulled from the buyer account and provided to the merchant regardless. A buyer can have a mobile device that can facilitate the transfer of the payment card information to the merchant. The payment card can be stored locally on the mobile device or can be stored remotely.

In some instances, a financial transaction may be permitted when the mobile device and the transaction device are within a predetermined proximity to one another. A financial transaction may be permitted when a buyer is in the proximity of a merchant.

Information about the merchant may be provided to the buyer when the buyer is within a predetermined distance from the merchant. In some instances, a plurality of merchants may be gathered at a location. A location-based event may occur, such as a farmer's market, food truck gathering, fair, carnival, convention, trade show, or any other-based event or gathering. Information about the event can be provided to the buyer. A location-based event may be an event where a plurality of merchants can gather and participate. The event may be a temporary event that is not permanently at a given location. The location-based event may regularly be at a given location but participating merchants may vary. The event can be a one-time event or a periodic event (e.g., annual, quarterly, seasonal, monthly, bi-weekly, weekly, daily). The participating merchants may be mobile merchants, or mobile aspects of merchants. For example, the participants may have a booth, stand, table, or truck. The participants may use structures that are not permanent or static. The participants in the event may change over time.

The presence of the event can be detected based on information gathered from the merchants. The type of event may also be determined. For example, the type of event may be extrapolated from the type of items that are being sold by the various merchants. In some instances, an event guide may be generated based on the information gathered from the merchants. One or more participating merchants may provide information.

FIG. 1 provides an illustration of communication between devices in an event determination system. In one example, an external device 300 may be provided, capable of communicating with one or more merchant 310a, 310b, 310c. The merchants may have a merchant device 315a, 315b, 315c which may be capable of communicating with the external device. An external device may also communicate with a buyer 320. The buyer may have a mobile device 325 or other type of device that may be capable of communicating with the external device. In some instances, the buyer device 325 may communicate directly with a merchant device 315c, and/or merchant devices may communicate directly with each other. Any communications herein may occur over a network, such as described elsewhere herein, or directly between devices.

Merchants 310a, 310b, 310c may be gathered at a location. One or more merchant may have a merchant device 315a, 315b, 315c. The merchant devices may be transaction devices that may facilitate a financial transaction for the merchant. The transaction device may function as a register. The transaction device may receive card payment information, and/or enable a merchant to select one or more item to be purchased as part of the financial transaction. In one example, the merchant may have a booth or stand with one or more individual associated with the merchant, such as a clerk. The individual may use the merchant device to conduct a financial transaction. The merchant device may be a register for the booth. In some instances, a single merchant device or multiple merchant devices may be provided for a booth. The merchant device may have one or more characteristic as described elsewhere herein. The merchant device may include a location-determination device, such as a GPS receiver or other device. The location-determination component to the merchant device may be used to determine the geolocation of the merchant device. The location of the merchant device may be determined to a high degree of specificity (e.g., within a mile, within several hundred meters, within a hundred meters, within tens of meters, within ten meters, within five meters, within three meters, within one meter, or within a fraction of a meter). The location of the merchant devices may be determined to a high enough degree of specificity to determine their location relative to one another when they are in adjacent booths. The location of the merchant device may be determined using satellites, telecommunication towers, or any other techniques known in the art. The merchant device locations may be used to determine whether an event is in progress and/or the type of event that is occurring.

A buyer 320 may have a buyer device 325, which may be a mobile device. The buyer device may be used to conduct financial transactions with one or more merchant devices. In some instances, the buyer device may be in proximity of the merchant device in order to permit the financial transaction. For example, the buyer device may be within a predetermined threshold distance, which may be on the order of a mile, 500 meters, 300 meters, 200 meters, 100 meters, 50 meters, 20 meters, 10 meters, 5 meters, 3 meters, or 1 meter of a merchant transaction device. The buyer device may be used to find the location of one or more merchants or merchant devices. For example, merchants that are in relatively close proximity to the buyer device may be shown. In some instances, if an event is detected in the proximity of the buyer, the event may be shown on the buyer device.

In one example, one or more merchants 310a, 310b, 310c may be gathered for a location-based event. One or more of the merchants may have a merchant device 315a, 315b, 315c. The merchant device may provide information about the merchant location to an external device 300. The external device may be one or more servers, or may have a cloud computing infrastructure. Memory and/or processing power of the external device may be on a single device or distributed over multiple devices. Any other architecture, such as a peer to peer architecture, may be employed. The external device may use the information from the merchant devices to determine that an event is taking place. The location of the merchant devices relative to one another or other geographical considerations may be used in said determination. Transactions that occur using merchant devices may also be used. Event determination systems and methods, as described elsewhere herein, may be employed in detecting the presence of a location-based event.

A buyer 320 who may have a mobile device 325 may communicate with the external device 300. For example, the external device may provide the buyer device with information about merchants in the buyer's proximity. If the external device has detected that an event is underway, the external device may provide information about the event in the buyer's proximity. The information may be displayed on a user interface of the buyer device. The information may be displayed via a mobile payment application, an alert, passbook (e.g., Apple Passbook) or any other technique. The information may be sent via the application, sms (text message), phone call, e-mail, passbook, or any other technique. In one example, buyers may be targeted based on the relevance of the event to the buyer. For example, if a buyer frequently purchases books or has expressed an interest in books, a book fair may be displayed on the buyer device.

In some instances, a buyer may be notified of an event when the location of the event is determined to be at a location relevant to the buyer. This may be based on proximity, such as whether the buyer is within a predetermined threshold distance from the event. The buyer may have a device that may provide information about the location of the buyer device. Thus a buyer's location may be approximated. For example, the buyer may be carrying a smartphone which may alert the buyer based on the smartphone's location. Notification of an event to a buyer may also be based on predicted proximity, such as whether the location is coming up in the direction that the buyer is traveling, or along or near a route that the buyer frequently takes. This may also include looking at whether the buyer has currently plotted a planned route, and whether the location is along or near the planned route. The planned route may be created as part of a navigation system (e.g., the buyer requesting a plotted course to a destination). The notification may also occur when the event location is at or near a location that the buyer is frequently visiting (e.g., near the buyer's home, near the buyer's work, the buyer's gym, or other locations that the buyer is at frequently or regularly). The location of the event may be determined to fall within a neighborhood that may be of significance to the buyer. For example, the neighborhood may be the neighborhood of the buyer's home, work, or other frequently visited location. The neighborhood may intersect a buyer's current or planned route. In some instances, the buyer may be notified of an event that need not be mobile. For example, the buyer may learn of an event through a buyer's desktop computer even if the desktop computer is not at the event site, based on other information about the buyer locations and habits. For example, the buyer may use the buyer desktop to map a route to a destination. The buyer may be informed of the event through the desktop, located along the route or near the destination.

Also, a buyer may be notified of an event when the event is determined to be of particular interest or relevance to the buyer. This may take into account the buyer's past purchases. For example, if the buyer's past purchases reflect an interest in a type of item that is the same as items sold at the event, or related to items sold at the event, the buyer may be notified of the event. For example, if the buyer frequently purchases pet supplies, and the event is pet related, the buyer may be notified. In another example, if the buyer made frequent past purchases from a particular merchant, the presence of the merchant at the event may be taken into account regardless of the types of items being sold, or in conjunction with the types of items being sold. This may occur regardless of the buyer's location relative to the event, or may occur partially depending on the buyer's location relative to the event.

In some instances, both the buyer's location relative to the event, and information about the buyer's past purchases may be considered in determining whether to provide an alert to the buyer. In some instances, a high degree of relevance in one category may make up for a deficiency in another category. For example, if the buyer is very close to the event (e.g., within several blocks), but has not made many past purchases of items related to items at the event, the buyer may still be notified. In another example, if the buyer is not very close to an event but is within a predetermined proximity (e.g., within 40 miles) and has made numerous past purchases related to items at the event, then the buyer may still be notified of the event. For example, high degree of interest can outweigh a low degree of proximity and vice versa.

In some instances, the buyer may search, using the buyer device, for one or more merchants or events. Even if the merchant or event is not in the buyer's proximity, the buyer device may display information about the searched merchant and/or event. For example, the buyer may search for "farmer's markets" within 20 miles of the buyer's location, or within a particular city or vicinity. The systems and methods herein may advantageously permit a location-based event (e.g., temporary location-based event) to be found using search functionality, and is not limited to static merchant sites. Thus, even if the location of events or mobile merchants may change over time, a buyer may be able to find such events or mobile merchants. The buyer may find events or mobile merchants serendipitously (e.g., there may happen to be an event underway in the buyer's proximity) or through intentional searching (e.g., the buyer may search for events or particular event types). The buyer may be informed based on location of the buyer, interest of the buyer and/or past transactions.

In some instances, the buyer device may be provided with promotional information relating to the event. Such promotional information may come with an alert or notification of the presence of the event. For example, the buyer device may receive a notification that all items purchased at the event will be discounted. In another example, the buyer device may receive a notification that merchant specific-offers may be provided. For example, a merchant at the event may be offering a buy one-get one free promotion if the buyer uses the buyer device to make a purchase. The promotions may be offered from the merchants themselves, an event organizer, or a third party. The promotions may be generated based on buyer past purchases or interests. Such promotional information can also include recommendations for one or more merchants at the event which may be of interest to the buyer. A merchant may be promoted if the merchant is selling an item similar or related to those that the buyer has purchased in the past, or if the merchant is a merchant that the buyer has purchased from in the past.

The external device 300 may also provide additional information about the events/mobile merchants based on collected information, such as the type of event. The external device may also be able to aggregate the information to create a guide to the event. The guide may include information about the merchants present at the events, contact information (e.g., for merchants, event participants, event organizers), the items and types of items being sold at the event, the prices of the items being sold, the locations of the merchants relative to one another, a map of the merchants at the event, real-time status updates from merchants (e.g., discounts, offers), wait-times (e.g., at various merchant stalls/booths/trucks/tables/locations), or any other information. In some instances, the information about the items being sold may include information such as item name, image of item, item type, popular items, wait times for items, suggested items, sold-out items, items that are close to being sold out, or any other information. In some embodiments, such information may include promotions or offerings. For example coupons, discounts, free items, or other offerings may be presented in the guide. The promotions or offerings may be specific to particular participating merchants, or may be applied anywhere in the event. Such information may be displayed in a visually intuitive manner. For example, such information may be superimposed over a generated map of the event. Alternatively, such information may be displayed in a list, table, or any other manner.

The guide may be sent to buyer devices. In some instances, the guide may be pushed down to a buyer device when the buyer is detected to be within a proximity of the event. For example, the buyer may be within a predetermined distance, which may be about 5 miles, 2 miles, 1.5 miles, 1 mile, 0.7 miles, 0.5 miles, 0.3 miles, 0.2 miles, or 0.1 mile of the event. The guide may be pushed to a buyer based on relevance to the buyer or buyer demographics. The guide may be pulled by the buyer when the buyer requests or searches for information about the event. In some instances, the guide may also be sent to merchants at the event. In some instances, the guide may be sent to mobile devices (e.g., of a buyer). The guide may also be sent to any other device, such as a buyer's computer. A web directory may be generated for the event. A buyer may be able to view the web directory from the buyer's home or other location, which may or may not be near the event.

In some instances, an external device 300 may receive the communications from the merchants and/or buyer devices and may make the determination about the event. The external device may also formulate the event guide. In other instances, the merchants may communicate directly with the buyer device without requiring an external device. The buyer device may receive information from the plurality of merchants and may make the determination of the event, and/or formulate an event guide. In another example, the merchants may communicate with one another directly in a peer to peer manner. The merchant devices may make the determination of the event and/or formulate an event guide that may be delivered to the buyer device.

Figure 2:
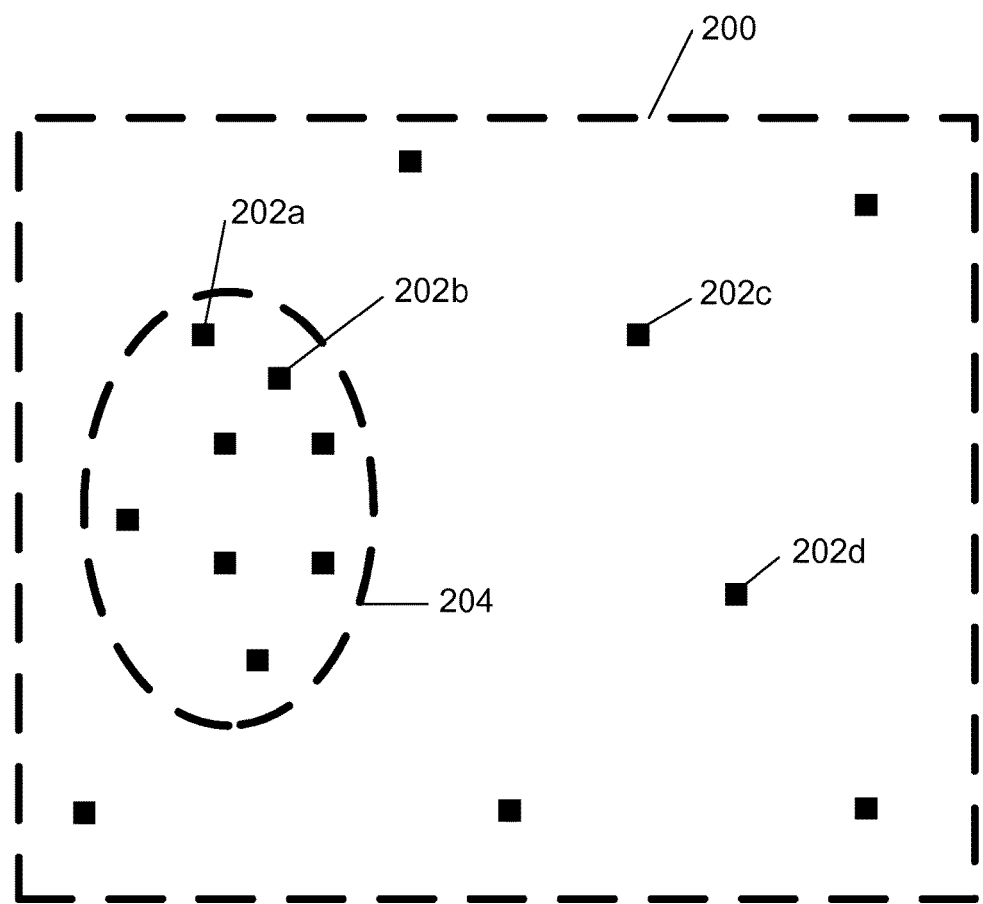
FIG. 2 provides an example of location-based clustering of one or more sellers in accordance with an embodiment of the invention.

FIG. 2 provides an example of location-based clustering of one or more merchants in accordance with an embodiment of the invention. The location-based clustering of one or more merchants may be useful in determining whether an event is taking place.

In some instances, the location of one or more merchants may be provided. The location of the one or more merchants may be provided by the merchants or merchant devices. The merchants may send the information. A merchant may choose whether to provide the information. Any number of merchants may provide the information which may be collected and useful for event determination.

In some instances, the merchants may be mobile or may have a mobile aspect (e.g., food truck, a booth at a farmers market, a table at a trade show). The location of the mobile merchant aspect may be provided. The mobile aspect may be a physical merchant location that may move locations. The mobile aspect may be provided temporarily at a given location. The mobile aspect may optionally relocate. The mobile aspect may or may not be provided in conjunction with a stationary aspect (e.g., traditional storefront). A mobile merchant site is optionally not the merchant's usual brick and mortar store.

In some instances, the merchants may enter information about the mobile merchant's location. For example, a store may also have a booth that will be participating in a farmer's market at Plaza A on June 1 from 9 am-3 pm. Such information may be entered by the merchant and stored in the system. In other embodiments, such information may be automatically collected without requiring any action by the merchant. No pre-registration or separate data entry may be required of the merchant. For example, the location of a merchant transaction device may be tracked. Geo-location systems, such as those described elsewhere herein may be used to determine the location of the merchant transaction device. The merchant transaction device may be used at the mobile merchant site. Thus, it may be tracked that the merchant transaction device is at Plaza A. Any combination of automatically collected merchant location information and/or merchant entered information may be used to determine, e.g., the location or hours of business of one or more merchants. Such information may be entered and/or collected through the transaction device that may be used at a point of sale.

The merchant locations, which may include mobile and/or static merchant locations may be stored and aggregated in the system. An example of a merchant location map 200 may show the location of one or more merchants 202a, 202b, 202c, 202d. The location may be stored in any manner. The location may be stored as geographical coordinates, (e.g., latitude, longitude, and/or altitude) street locations, in relation to reference points (e.g., landmarks, buildings, streets, parks plazas), on a map, or any other manner. The locations of the merchants may be useful in determining whether a location-based event is occurring.

For example, the proximity of one or more merchants and/or the proximity of merchant transactions to one another may assist with determining an event. For example, a cluster of merchants 204 may be found. It may be determined that if the density of merchants is higher than a particular threshold, that a likelihood of an event may be increased. Density of merchants may refer to a number of merchants per particular area or volume. For example, in some instances, a location-based event may result in a higher concentration of merchants in a smaller area or volume. For example, it may be determined that some merchants 202a, 202b are likely participating in an event by falling within a merchant cluster 204 while other merchants 202c, 202d may be less likely to be deemed to be participating in the event by being further apart. In some instances, a threshold density may be determined (e.g., number of merchants per unit area or volume). If the number of merchants and/or number of merchant transactions at or around a location meets or exceeds the threshold density, an increased likelihood of an event may be determined. The total number of merchants in a vicinity may also be considered. Events may be expected to have a certain size or number of merchants. Threshold numbers or densities may be predetermined by the system or may be established by a buyer. Threshold numbers may be modified when combined with other factors for determining the likelihood of an event. The threshold value may be numerical value (e.g., 30 merchants per 100 square meters).

In some instances, clusters of merchants transacting in a proximity or geofence may be provided. The geofence may be a virtual perimeter of a geographic area. The geofence may be dynamically generated (e.g., as in a radius around a merchant or point location). The geofence can be a predefined set of boundaries, like neighborhood boundaries. The merchants in the proximity or geofence, or numbers or types of transactions within the proximity or geofence may be detected.

In another example, the location of the merchants may assist with detecting the presence of an event. For example, geographic data may be combined with the merchant location data. For instance, merchants may be provided at a location that may have an increased likelihood of being used for a location-based event. For instance, if the merchants are found to be located at a convention center, plaza, fairground, in the streets, in a parking lot, in a park, in a hotel, or any other type of specialized location, there may be an increased likelihood of an event. Such information may be combined with merchant density. For example, if a high density of merchants is provided at a specialized location, an increased likelihood may be provided that an event is in progress. Some merchants may be provided at the specialized location while other merchants may be away from the specialized location and may be deemed less likely to be participating in the event.

Additional merchant location information may be considered in determining the likelihood of a location-based event (e.g., temporary location-based event). For example, the location of a merchant transaction device may be tracked. If the merchant transaction device frequently moves around, it may be determined that the merchant is a mobile merchant. In some instances, a mobile merchant may self-identify as a mobile merchant. The mobile merchant may register in a directory as a mobile merchant, optionally upon request of the system. If a number of mobile merchants are clustered together, it may be more likely that a location-based event is occurring, than if a number of static merchants are close together. Similarly, if the merchant enters location information and the location information changes frequently, the likelihood of an event is increased. Thus, the mobility of merchants' locations may be considered in detecting the presence of an event.

In some instances, buyer data may be collected and/or considered. In some instances, a buyer or merchant may select an option to have such information collected. Not selecting an option may cause the information not to be collected or considered. For example, when a buyer device comes into proximity of a mobile device, the buyer location may be assessed. Factors such as density of buyer in a given location relative to the sellers, or mobility of the buyer may or may not be considered in determining whether an event is underway. Information may be coupled from multiple buyer devices and aggregated with merchant devices.

Additional information may be pulled from public or private records. Such public or private records may include third party records. In one instance the system may crawl the web or known databases for collaborative information. The third parties may be independent of the merchants and/or the buyers. For instance, city databases may include information about events. If signals are received from merchants located at the advertised locations, they may be determined to be part of the event.

Transaction information may also be included in assessing whether an event is underway. For example, the identity and/or price of the items being purchased may be stored and/or accessed. Based on the items or types of items being purchased, the presence of an event may be detected. For example, certain items may more likely be sold at temporary location-based events, as compared to static merchant sites. In some instances, having a high concentration of merchants selling all of a particular type of item or related types of items may yield an increased likelihood of a location-based event being underway. In another example, the frequency of items sold may also be detected and considered. For example, in some instances, a mobile merchant at an event may be expected to have faster turnover than a static merchant site.

In addition to detecting the presence of an event, any of the information collected from or related to the sellers, such as the information described above, may be used to determine the type of event. For example, the location of the sellers may be considered in determining the type of event. If merchants are located on the street, the event may more likely be a street fair, and if the merchants are located within a convention center, the event may more likely be a trade show. The items being sold may also be considered in determining the type of event. For instance, if the merchants are all selling a particular type of product, the event may be tied into the type of product (e.g., all selling textiles, a textiles convention or trade show may be occurring). If the merchants are selling produce, a farmers market may more likely be occurring. Additional factors to merchant location and items sold, such as density of merchants, mobility of merchants, frequency/speed of items sold, third party data about events, or any other information from or relating to sellers and/or buyers may be considered.

In some instances, self-identified information from merchants may be considered. Merchants may enter information, such as their business category, information about themselves (e.g., text, image, audio, video description), information from third parties about the merchants. The merchants may include information about the items or types of items they sell. Additional techniques may be employed to determine the merchant's business or the types of items the merchant sells. Such information may be considered with additional factors, such as location or transaction-based information in determining whether respective merchants are participating in a location-based event.

In some instances, the event may fall into one or more event category. One or more event category may be selected from a group of event categories to characterize the event. Examples of event types and/or categories may include but are not limited to farmer's markets, food truck gatherings, fairs (e.g., food fairs, crafts fairs, cultural fairs, street fairs), carnivals, conventions, trade shows, or other events. Events may be related to food, drink, crafts, entertainment, home products, specialized products, or any other item categories.

Event detection and/or type determination may occur via one, two, three, four, five or more factors or types of information collected by the system from one, two, or three of merchants, buyers, and/or third parties. In some instances, the determination may be made with aid of a location-based factor. A location-based factor may be a factor that utilizes the location of merchant and/or buyer. A location-based factor may include using information collected from a device of the merchant and/or buyer, such as geo-location information. Examples of location-based factors may include merchant density, merchant mobility, merchant location (e.g., geographic location, whether on street, in building, etc.), buyer location, and/or buyer mobility. In some instances, a non-location-based factor may be used. A non-location-based factor may be independent of the merchant and/or buyer location. A non-location-based factor may not utilize information collected from a device of the merchant and/or buyer pertaining to geo-location. Examples of non-location-based factors may include transaction information (such as items sold, frequency of transactions), or third party information. The factors used for event detection and/or type determination may include one or more location-based factor, one or more non-location-based factor, or any combination thereof. Transaction-based factors may be used for event detection. Transaction-based factors may include transaction information such as items sold, frequency of transactions, prices, or any other transaction-related information. The factors used for event detection and/or type determination may include one or more transaction-based factor, one or more non-transaction-based factor, or any combination thereof. For instances, a combination of location-based factors and transaction-based factors may be considered. The factors used to detect the presence of an event and/or the type of the event may be the same, or may vary.

Figure 3:
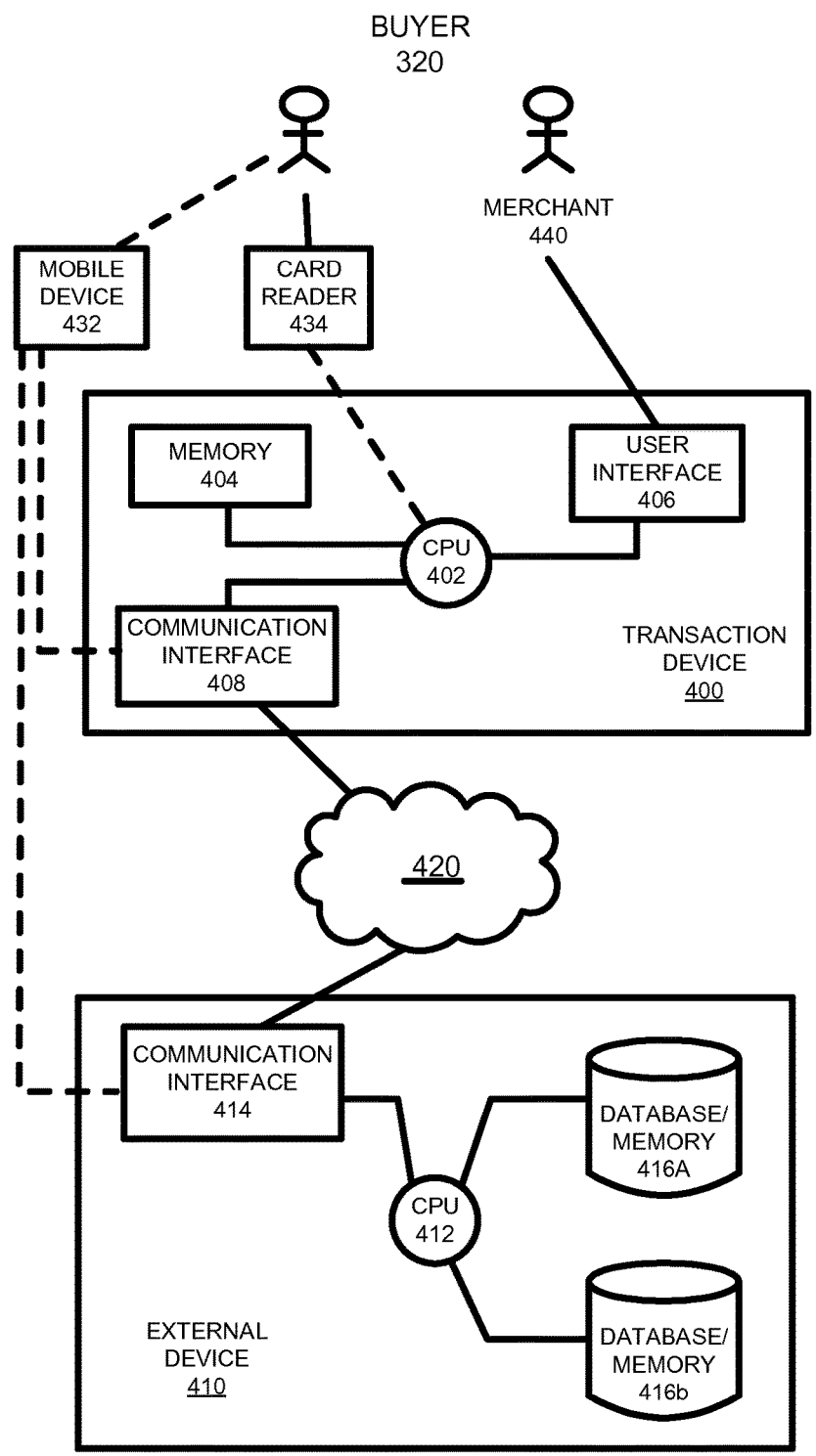
FIG. 3 provides an example of a mobile payment system provided in accordance with an embodiment of the invention.

FIG. 3 provides an example of an aspect of a mobile payment system provided in accordance with an embodiment of the invention. The mobile payment system may be utilized at a mobile merchant or a merchant at an event. A mobile merchant or merchant aspect may have a transaction device at the event. One or more transaction device 400 can communicate with one or more external device 410 across a network 420.

The transaction device 400 can be provided at a point-of-sale (POS). The POS may be at a merchant location, such as a location of a store, business, or physical point of a financial transaction. The POS may be at a temporary location-based event, which may be a physical point of a financial transaction that may be changing or changeable. The mobile merchant may be at the temporary event for a predetermined period of time. Any description of a temporary event may include an event that is only at a location temporarily, or an event where one or more participants/merchants may change over time. In some instances, the predetermined period of time may be a month or less, a bi-week or less, a week or less, several days or less, one day or less, several hours or less. Examples of POS locations include, without limitation, farmer's markets, fairs, carnivals, conventions, trade shows, truck gatherings, food stores, grocery stores, cafes, electronic stores, department stores, bars, clubs, restaurants and book stores. A POS can be the site of a transaction, such as purchase or exchange of items, goods, and/or services. Any description herein of items sold may also include any goods, services, or other types of transactions.

The transaction device 400 may be any type of device, such as personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The transaction device can be or can function as a register at a POS. The transaction device can have a central processing unit (CPU) 402, memory 404, user interface 406, and/or communications interface 408. The transaction device may also include a location device, such as a GPS receiver, that may assist with determining the location of the transaction device. A transaction device may also have a clock or may be in communication with a clock that may permit the transaction device to track the time associated with each of the transactions and/or other actions of the transaction device. Any of these components may be in communication with each other. These components have one or more features or characteristics as described elsewhere herein. The CPU can be in communication with the memory, user interface, and/or communications interface and/or can direct the operation of the transaction device.

The user interface 406 can be presented on an electronic display of the transaction device 400. The user interface can be presented through a web browser or application running on the transaction device. The electronic display can be a screen, such as an LED screen, OLED screen, LCD screen, plasma screen, and/or touchscreen (e.g., capacitive or resistive touch display). One or more individual associated with the merchant 440 can interact with the transaction device via the user interface. For example, the transaction device can function as a register, and a clerk can view information and enter information through the transaction device interface. In some instances, a buyer 430 may or may not directly interact with the transaction device. For example, a clerk can permit a buyer to enter information into the transaction device through the user interface. Alternatively, the buyer can provide information to the clerk who enters information to the user interface. The buyer can view information provided by the transaction device. Alternatively, the buyer does not view information displayed on the transaction device.

A card reader 434 can optionally be provided in accordance with an embodiment of the invention. In one example, the buyer 430 can provide a payment card that can be read by the card reader. The card reader can be coupled to or in communication with the transaction device 400. For example, the card reader can be communication with one or more processor 402 of the transaction device. In other examples, the card reader can communicate with the transaction device via one or more communication interface 408. In some embodiments, the card reader 434 is integrated as a part of the transaction device 400. Alternatively, the card reader can be a separate device from the transaction device and can convey information to the transaction device. The card reader can communicate with the transaction device via a hard-wired or wireless connection. In some embodiments, the card reader is integrated as part of a mobile device that is capable of communicating with the transaction device. The card reader can be attached to or in communication with a mobile device that can communicate with the transaction device.

The card reader 434 can read information from the payment card 432 and transfer the information to the transaction device 400. For example, the card reader is capable of reading information from the payment card with a single swipe. The card reader can have a slot through which the payment card may pass through. The payment card can have a read head that can contact or come into close proximity to a magnetic strip of the payment card, an integrated chip of the payment card, or other encoded information on the payment card.

A mobile device 432 may optionally be used by a buyer 320 in accordance with an embodiment of the invention. For example, the buyer can communicate with the transaction device 400 via the mobile device 432. The mobile device may have payment card information stored thereon that may be sent directly to the transaction device, or may instruct that payment card information be sent to the transaction device from another source, such as an external device 410. The mobile device may communicate with the transaction device via a communication interface 408. The mobile device may optionally communicate with the external device, e.g., through a communication interface 414. The mobile device may have a clock or be in communication with a clock that may permit the mobile device to track the time associated with one or more actions of the mobile device. The mobile device may have a location device, such as a GPS receiver that may assist with determining the location of the mobile device. The relative locations of the mobile device and transaction devices may be considered in determining whether the transaction is permitted. The location of the transaction devices and/or mobile devices may be considered in the determination of whether an event is taking place and/or the type of event. The information may be useful in the formulation of an event guide.

The transaction device can store information from the payment card or relating to payment methods in memory 404. The transaction device optionally sends information from the payment card or methods via a communication interface 408 to an external device 410. Information about the transaction may be sent to the external device, and may be useful for determining whether an event is taking place and/or the type of event. The information may also be useful in the formulation of an event guide.

The transaction device 400 can communicate with one or more external devices 410 over a network 420. The network can be a local area network (LAN) or wide area network (WAN), such as the Internet. The network can be a telecommunications network, such as a cell phone network, or data network.

An external device 410 may be any type of device, such as servers, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants.

The external device 410 can have a CPU 412, communications interface 414, and/or memory, such as one or more databases 416a, 416b, 416c. The external device can optionally have a user interface. The external device can be at the POS. Alternatively, the external device can be remote to the POS and/or transaction device. The external device can be in a different facility or room than the POS and/or the transaction device. The external device can be at a different part of the world than the POS and/or transaction device.

In one example, one or more databases 416a, 416b can be provided. One or more databases can include information about the buyer, such as the buyer's name, contact information (e.g., email address, mailing address, telephone number, social networks), date of birth, payment card information (e.g., payment card number, expiration date, cardholder name, security code), buyer account settings and/or preferences. One or more databases can also include information about products that can be purchased. For example, merchant side information relating to available products, categories of products, costs, expiration dates, and/or inventory. One or more databases can include information about transactions (e.g., items that were purchased, categories of purchased items, time of purchases, frequency of purchases, financial exchange during purchase, fees, taxes, payment card information). One or more databases can include location-based information. For example, the databases may include historical information about the location of merchant devices and/or buyer devices over time. The databases may also include related geographical information, such as whether the merchant device locations are significant or associated with known landmarks, buildings, addresses, types of locations, etc.

The databases 416a, 416b can be provided separately or combined. The databases can be provided in memories of different devices, or can be provided within one or more of the same device. The database can be provided in a memory of an external device, or can be provided separately from the external device and accessed by the external device. The device(s) can be in communication with one another so that information from the various databases can be accessed and/or aggregated. Location information, transaction information, and/or any other type of information can be pulled during a determination of an event, or transaction.

In accordance with an embodiment of the invention, information may be collected from one or more transaction devices 400 and aggregated and/or stored at an external device 410. Such information may be useful in determining the presence of an event and/or additional details associated with the event. Location-based information relating to the transaction devices may be considered. Transaction based information may also be considered. In an example of a transaction, a buyer 430 may approach a POS. The buyer can optionally provide a payment card, which can be swiped or read by the card reader 434. In another example, a buyer may have a mobile device 432 that can cause payment card information to be transmitted to the transaction device or permit a financial transaction. Payment card information can be manually entered directly into the transaction device. The buyer and/or merchant 440 can interact with a transaction device 400. For example, the transaction device can have a screen that can include information that can be read by the merchant and/or buyer. For example, the screen can display information about one or more product that the buyer is purchasing from the merchant. The transaction device can communicate over a network 420 with the external device. The communication may occur via a communication interface 408 of the transaction device and a communication interface 414 of the external device. The external device can access one or more databases 416a, 416b. For example, if the buyer already has an account, information from the database pertaining to the buyer account can be transferred and/or displayed at the transaction device. If the buyer does not have an account, a buyer can have an option of creating an account on the spot. Information about the transaction may be stored in the databases. Such information, coupled with the location-based information can be useful for detecting the presence of an event and/or details associated with the event. For example, an event guide may be generated. The event guide may be updated or may evolve as additional transaction information is collected.

Figure 4:
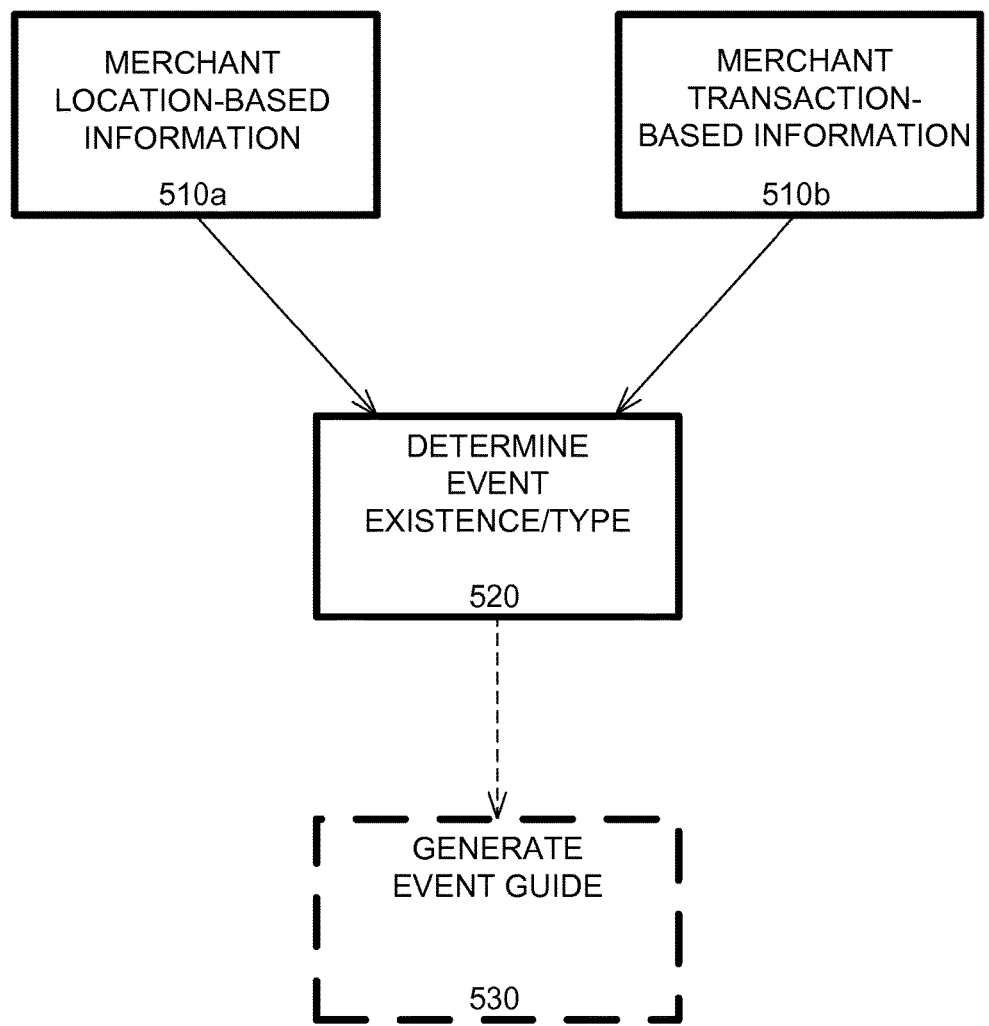
FIG. 4 provides an example of a method for determining event existence and/or type in accordance with an embodiment of the invention.

FIG. 4 provides an example of a method for determining event existence and/or type in accordance with an embodiment of the invention. Any steps or methods described herein may be performed with aid of a programmable processor. Non-transitory computer-readable media may provide code, logic or instructions for performing one or more steps. Merchant location-based information 510a and merchant transaction-based information 510b may be considered in determining an event existence and/or type 520. Optionally, an event guide 530 may be generated for a detected event.

Merchant location-based information 510a may be considered in determining event existence and/or type. Examples of merchant location-based information may include merchant location coordinates, location of merchants relative to other known geographic features or addresses, location of merchant within a neighborhood or geofence, merchant density, merchant mobility, or any other information that may utilize the location of the merchant. Location-based information may utilize a signal from a merchant device that may assist with determining the location of the merchant device. Such a signal may be coupled with the use of satellites, telecommunication towers, or other devices in determining the location of the merchant device.

Merchant location information may be coupled with time. For example, the merchant's location over time may be tracked. One or more timestamps or other time indicators may be used in order to follow the merchant device's location over time. The time dimension may be useful for identifying mobile merchants and/or assessing the likelihood of an event or determining the type of event.

Merchant transaction-based information 510b may be considered in determining event existence and/or type. The merchant transaction-based information may or may not be combined with merchant location-based information in performing said determination. Examples of merchant transaction-based information may include items that were purchased, categories of purchased items, time of purchases, frequency of purchases, financial exchange during purchase, fees, taxes, payment card information, or any other information that may be collected for a transaction. In some instances, transaction-based information collected within a time window may be considered in the determination of the event. Examples of a time window may include transaction-based information that has been collected within the past day, 12 hours, 10 hours, 8 hours, 6 hours, 5 hours, 4 hours, 3 hours, 2 hours, 1 hour, 30 minutes, 10 minutes, 5 minutes, or any other length of time. A time window may include transaction-based information that had been collected that same day. In some instances, transaction-based information collected under specified circumstances may be considered in the determination of the event. For example, transaction-based information collected at that same location may be considered for event determination and/or guide generation.

Optionally, additional information may or may not be considered for event determination. For example, third party information, such as information about events or locations may be considered. Also, information relating to buyer-devices may also be considered, which may include location-based information, transaction-based information or other information. Merchant categories, information from merchants such as text descriptions, deals or offers from merchants, menu information before a transaction occurs or other information may be considered. Other examples described elsewhere herein may be considered. In some instances the information may be considered in addition to location-based information and/or transaction-based information. In some instances, the other information may be considered alternatively to location-based information and/or transaction-based information.

Such information may be stored in memory in the system. The information may be stored in one or more database. The memory may be in a single device, or may be distributed over a number of devices, which may include but are not limited to a merchant transaction device, external device, and/or buyer device.

Any number of factors may be considered and/or weighted in the determination of event existence and/or type 520. One or more, two or more, three or more, four or more, five or more, six or more, eight or more, ten or more, 15 or more or 20 or more factors, such as those described herein, may be considered and/or weighted. In some instances, certain factors, alone or in combinations may increase or decrease the likelihood of an event, or be useful in detecting the type of event.

An event may be detect and/or reported without requiring any form of pre-registration. The event may be detected without requiring one or more participating merchants to advertise or register for the event. For instance, even unplanned or ad-hoc events may be detected, and information may be provided to parties who may not otherwise have known about the event.

An event type may be determined from a list of possible event types. Such event types may incorporate the types of items being sold at the event. Such event types may also incorporate the location of the event, or duration of the event. Event types may also incorporate the target audience or permitted participants of the event. Event types may include any of the examples described elsewhere herein.

An event guide 530 may be generated in accordance with an embodiment of the invention. The same information used to determine the event may be used to formulate the event guide. Alternatively, different information may be used to formulate the event guide.

A buyer may be informed of an event via the buyer device. The buyer device may also provide an option for the buyer to access an event guide. The buyer may select one or more event in order to view the associated event guide. The event guide may be generated based on the information collected without requiring pre-registration by the merchants. The merchants need not take any separate steps in order to assist with the formulation of the event guide. Information gathered from the use of the merchant devices in transactions may permit the generation of the event guide.

The buyer may also be provided with promotional information relating to the event. For example one or more promotions or offers may be displayed on the buyer device relating to the event as a whole or one or more merchants of the event. For example, the buyer may be informed of the presence of an event nearby and be offered a 30% discount at a merchant that is related to the buyer's past purchases. In another example, the buyer may be presented with an event guide as well as 5% off coupon for any participating merchant at the event.

Figure 5:
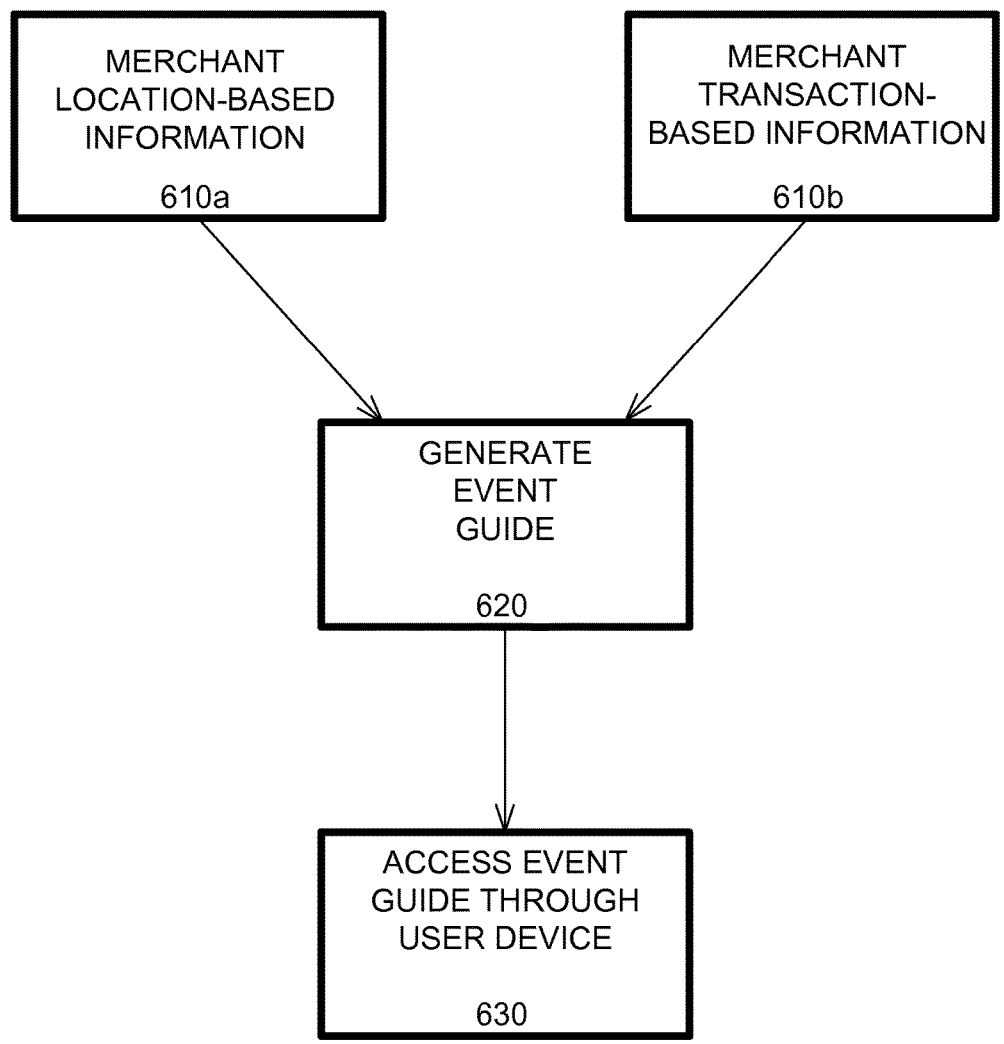
FIG. 5 provides an example of a method for generating an event guide in accordance with an embodiment of the invention.

FIG. 5 provides an example of a method for generating an event guide in accordance with an embodiment of the invention. Merchant location-based information 610a and merchant transaction-based information 610b may be may be used to generate an event guide 620. The event guide 630 may be accessed through a buyer device.

Merchant location-based information 610a may be used in generating an event guide. Examples of merchant location-based information may include merchant location coordinates, location of merchants relative to other known geographic features or addresses, merchant density, merchant mobility, or any other information that may utilize the location of the merchant. Location-based information may utilize a signal from a merchant device that may assist with determining the location of the merchant device. Such a signal may be coupled with the use of satellites, telecommunication towers, or other devices in determining the location of the merchant device. The specific location of a merchant may be determined relative to other merchants detected at the event. This may permit the generation of a map or written navigational guide that may assist a buyer with navigating the event. For example, a map may be generated and/or displayed on a buyer's device. The map may display the locations of mobile merchants, such as merchant trucks, stands, booths, or tables relative to one another. In some instances, the map may also show the location of the buyer device relative to the various merchant trucks, stands, booths, or tables.

Merchant location information may be coupled with time. For example, the merchant's location over time may be tracked. One or more timestamps or other time indicators may be used in order to follow the merchant device's location over time. Such information may be useful for determining likelihood of the timing of the event. For example, if the merchant devices usually move on after several hours at a location, this may indicate when an event will likely end, and this information may be provided in an event guide. Similarly, if the merchant devices usually stay in one place for an entire day, this information may also be included in an event guide.

Merchant transaction-based information 610b may be considered in the event guide formulation. Examples of merchant transaction-based information may include items that were purchased, categories of purchased items, time of purchases, frequency of purchases, financial exchange during purchase, fees, taxes, payment card information, or any other information that may be collected for a transaction. The event guide may include a directory of the merchant names and/or types that are participating in the event. For example, if a first merchant has many transactions for coffee, and a second merchant has many transactions for soap, such information may be included in the event guide. Indicators that the first merchant sells beverages and/or food, and that the second merchant sells cleaning or home products may be included. In some instances, the event guide may also include information about specific items being sold. Any of the information may be searchable. For example, the buyer may be able to search for merchants of a particular type. A buyer may also be able to search for which merchants, if any, are selling a particular item. Associated prices may be included with the item information. For example, a buyer may be able to view that apples may be sold at a first price from a first merchant at the event, while apples are sold at a second price at a second merchant at the event. The event guide may also include information about merchant popularity or the number of transactions at various merchants or for specific items.

Optionally, additional information may or may not be considered for generating an event guide. For example, third party information, such as information about events or locations may be considered. Also, information relating to buyer-devices may also be used, which may include location-based information, transaction-based information or other information. Buyer-device information may be used to determine the relationship of the buyer relative to the merchants and/or event. Buyer-device information may also be collected from other buyers to assist with formulating the event guide. Other examples described elsewhere herein may be considered.

Such information may be stored in memory in the system. The information may be stored in one or more database. The memory may be in a single device, or may be distributed over a number of devices, which may include but are not limited to a merchant transaction device, external device, and/or buyer device. Such information may include event guide information. Event guide information may be stored, and accessed. Alternatively, event guide information may be formulated every time it is accessed.

Event guide information may be updated periodically or in real-time as the other information is updated. For instance, event guide information may be updated every few seconds, minute, minutes, quarter hour, half hour, hour, or several hours. Event guide information may be updated within a second, seconds, a minute, minutes, quarter hour, half hour, or hour of an update to information used to formulate the event guide.

Any amount of information may be used in the formulation of an event guide 620. One or more, two or more, three or more, four or more, five or more, six or more, eight or more, ten or more, 15 or more or 20 or more types of information, such as those described herein, may be considered.

An event guide may be formed without requiring any form of pre-registration. The event guide may be generated without requiring one or more participating merchants to advertise or register for the event. For instance, even ad-hoc events may be detected, and information may be used to formulate an event guide on the fly. The event guide may include a list of merchants and/or items being sold. Such information may be updated as additional information is gathered. The event guide may assist a buyer with navigating an event.

The event guide may be accessed through a buyer device 630. For example, a buyer's device, such as a mobile device may access the event guide. The event guide may be sent or pushed to the buyer's device. The buyer's device may request an event guide, and may cause the event guide to be pulled to the buyer's device. The event guide may be pre-formulated externally from the buyer device (e.g., at an external device, or at one or more merchant device) and sent to the buyer device, or may be accessed by the buyer device. Alternatively, the event guide may be formulated at the buyer device on the fly. Information about the buyer relative to the event may be provided. For example, the buyer location relative to the merchants may be shown. For example, a map may show the buyer's location relative to the merchants at the event.

In another example, the any description of the buyer device may apply to a merchant device. One or more merchants, including merchants participating in the event may access the event guide. Information about the merchant relative to the rest of the event may be provided. For example, a merchant's location relative to the other merchants may be shown. Additional information about transactions may be shown. For example, the merchant may view what other items are being sold at the event. The merchant may optionally view prices for such items from other merchants.

In one aspect, systems are configured to implement methods of the disclosure. The systems may be directed to aspects of a mobile payment system in accordance with an embodiment of the invention. The systems can include a computer server ("server") that is operatively coupled to an electronic device of a buyer and/or an electronic device of a merchant. Any description of a server may apply to a single server or multiple servers in communication with one another. A server may be a consolidated or distributed system. In some instances, any description of a server may apply to a cloud computing infrastructure.

Figure 6:
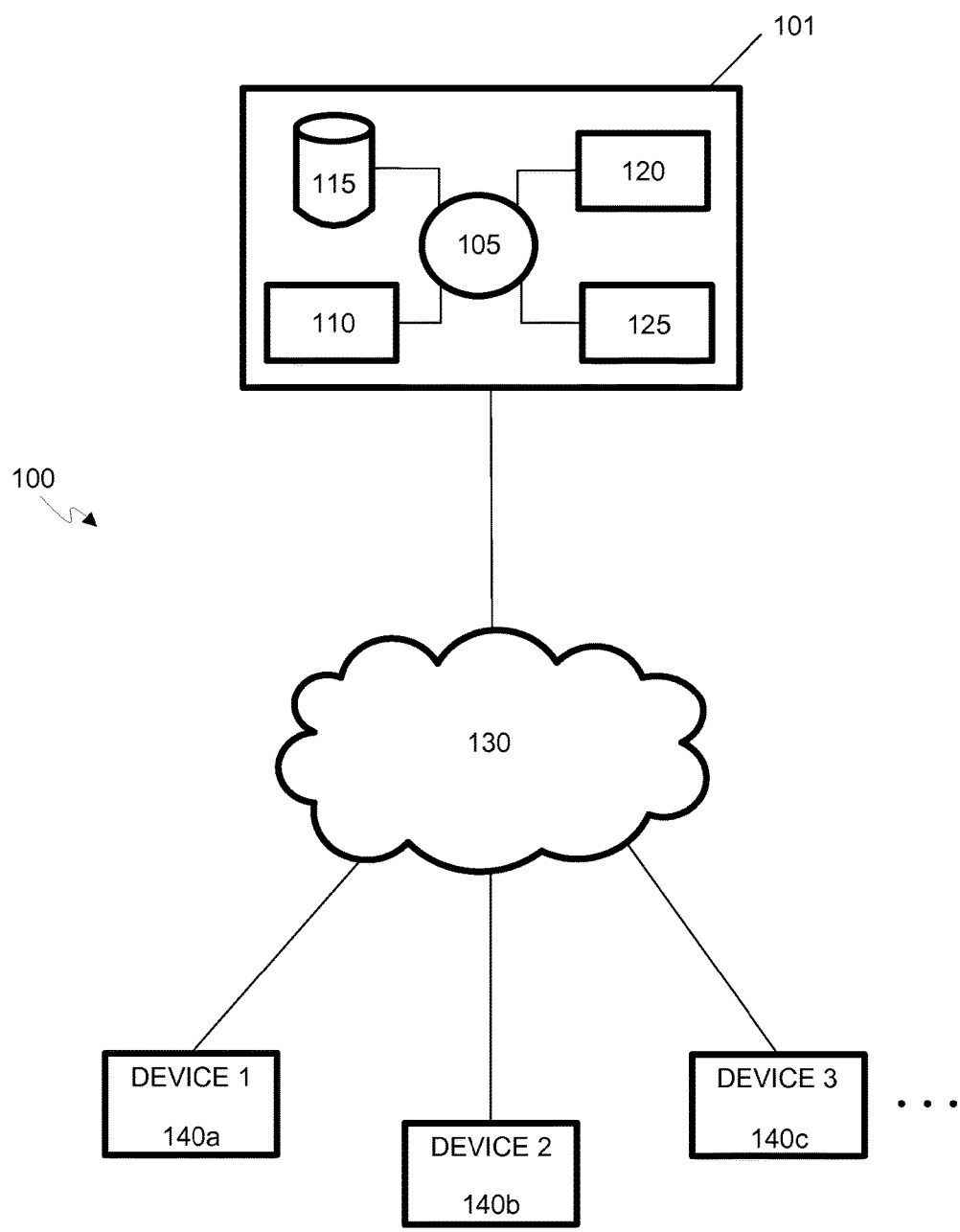
FIG. 6 schematically illustrates an aspect of an event determination system, in accordance with an embodiment of the invention.

FIG. 6 shows a system 100 adapted to enable a buyer to interact with merchants, in accordance with an embodiment of the invention. The system 100 includes a central computer server ("server") 101 that is programmed to implement one or more of the exemplary methods described herein. The server 101 includes a central processing unit (CPU, also "processor" and "computer processor" herein) 105, which can be a single core or multi core processor, or a plurality of processors for parallel processing. The server 101 can also include memory 110 (e.g., random-access memory, read-only memory, flash memory), optionally include an electronic storage unit 115 (e.g., hard disk), communications interface 120 (e.g., network adapter) for communicating with one or more other systems, and/or peripheral devices 125, such as cache, other memory, data storage and/or electronic display adapters. The memory 110, storage unit 115, interface 120 and/or peripheral devices 125 are in communication with the CPU 105 through a communications bus (solid lines), such as a motherboard. The storage unit 115 can be a data storage unit (or data repository) for storing data. The server 101 is operatively coupled to a computer network ("network") 130 with the aid of the communications interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130 in some cases, with the aid of the server 101, can implement a peer-to-peer network, which may enable devices coupled to the server 101 to behave as a client or a server.

The storage unit 115 can store files, such as filed related to merchant profiles and/or accounts, and buyer profiles. The server 101 in some cases can include one or more additional data storage units that are external to the server 101, such as located on a remote server that is in communication with the server 101 through an intranet or the Internet.

The storage unit 115 can store buyer and merchant transactional information. The storage unit 115 can store buyer transactional information, which can include, without limitation, personal information about the buyer (e.g., the buyer name, contact information), financial information (e.g., buyer payment card number, expiration date, security code, cardholder name), merchants from which the buyer has purchased products and/or services, the number of times the buyer has used a merchant, the frequency with which the buyer purchases products and/or services from a merchant, the types of merchants from which the buyer purchases products and/or services, clicks or other actions by the buyer that did not result in a purchase of products and/or services, and/or the actual products or services that the buyer purchased.

The storage unit 115 can store merchant transactional information, which can include, without limitation, information about the merchant (e.g., merchant name, contact information), financial information (e.g., merchant bank information), items that have been purchased during financial transactions, number of financial transactions, frequency of purchase, and/or merchant location (e.g., location of merchant's transaction device). Merchant location information may include information of a merchant's location over time. This may include locations where financial transactions occurred.

The server 101 can communicate with one or more remote computer systems through the network 130. In the illustrated example, the server 101 is in communication with a first computer system 140a, a second computer system 140b, and/or a third computer system 140c that can be located remotely with respect to the server 101. The one or more computer systems can be implemented on one or more device. In one example, the first computer system 140a is a merchant computer system that may have a database for recording transaction data, and the second computer system 140b is a buyer computer system, such as a computer system of a potential purchaser of a service or product of the merchant. Alternatively, any of the computer systems may be any combination of merchant and/or buyer computer systems. The first computer system 140a, second computer system 140b, and/or third computer system 140c can be, for example, personal computers (e.g., portable PC), slate or tablet PC's (e.g., Apple® iPad, Samsung® Galaxy Tab), telephones, Smart phones (e.g., Apple® iPhone, Android-enabled device, Blackberry®), personal digital assistants, or wearable electronics (e.g., smart watches, Google glasses).

In an example, the second computer system 140b is a portable electronic device of a buyer that desires to search for and find merchants and/or events (which may have one or more merchants) at or in proximity to a geolocation of the buyer (e.g., within a certain distance from the geolocation of the buyer). If the second computer system is sufficiently close to a merchant, the second computer system may communicate with the server and/or the first computer system. The buyer can access the server 101 via the network 130 to request the search. The server 101 can conduct the search and transmit search results to the second computer system 140b of the buyer. The search results can be displayed on a graphical user interface of the second computer system 140b. In some cases, any or all of the first computer system 140a, the second computer system 140b, and/or the third computer system 140c have a geolocation.

In one example, the first computer system and/or the third computer system may be transaction devices of merchants. The proximity of the first computer system to the third computer system may be determined. This may assist with determining that a location-based event may be occurring. The proximity of the second computer to the first computer system and/or the third computer system may be determined. This may assist with determining the relevance of the event to the buyer (e.g., if a buyer is in the vicinity of an event, the event may be deemed more relevant).

Any number of computer systems may provide information on their locations, transactions, or other information. In some instances, the information from many merchants may be collected and/or aggregated.

In some situations the system 100 includes a single server 101. In other situations, the system 100 includes multiple servers in communication with one another through an intranet and/or the Internet.

The server 101 can be adapted to store buyer profile information, such as, for example, a name, physical address, email address, telephone number, instant messaging (IM) handle, payment information, educational information, work information, social likes and/or dislikes, products likes and/or dislikes, merchant preferences, favorites types of merchants (e.g., restaurants preferred over bars) and historical information of past transactions of the buyer (which may be transactions made using the system 100), and other information of potential relevance to the buyer or other buyers. Such profile information can be stored on the storage unit 115 of the server 101.

Methods as described herein can be implemented by way of machine (or computer processor) executable code (or software) stored on an electronic storage location of the server 101, such as, for example, on the memory 110 or electronic storage unit 115. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110. Alternatively, the code can be executed on the second computer system 140 of the buyer.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Non-transitory computer readable media can be stored in one or more memory unit described herein. The computer readable media can include code, logic, or instructions for performing one or more steps described herein.

Aspects of the systems and methods provided herein, such as the server 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which can provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The server 101 may be able to access information through any techniques known in the art. Data warehousing techniques may be utilized. In some alternative embodiments, the server can be configured for data mining, extract, transform and load (ETL), or spidering (including Web Spidering where the system retrieves data from remote systems over a network and access an Application Programmer Interface or parses the resulting markup) operations, which may permit the system to load information from a raw data source (or mined data) into a data warehouse. The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+®, Linkedin®) or on publisher sites, such as, for example, weblogs.

The results of a buyer-initiated search for merchants can be presented to a buyer with the aid of a user interface (UI), such as a graphical user interface (GUI), on an electronic device of the buyer. In some situations, a GUI can enable a buyer to access the results of a search for entertainment events at a designated geographic location.

The UI, such as GUI, can be provided on a display of an electronic device of the buyer or merchant that is adapted to provide geolocation information of the buyer or merchant, such as, for example, measure (or calculate) the geolocation of the buyer or merchant. The display can be a capacitive or resistive touch display, or a head-mountable display (e.g., Google® Goggles). Such displays can be used with other systems and methods of the disclosure.

Methods of the disclosure may be facilitated with the aid of applications (apps) that may be installed on electronic devices of buyers or merchants. An app can include a GUI on a display of the electronic device of the user or buyer.

Systems of the disclosure may include both buyer and merchant data. This advantageously permits a system to determine relevance ranking that can be user specific and directed at select one or more merchants or types of merchants. This may advantageously permit the aggregation of information about merchants in the system to determine the likelihood of an event. Based on information about the buyer, it may be determined if events are relevant to the buyer, and such information may be provided to the buyer if relevant. The information may be provided to the buyer via one or more techniques. For example, alerts or notifications may be provided to the buyer if the event is determined to be relevant to the buyer. If the event is deemed to be less relevant to the buyer, the event may be ranked at a top of a directory accessible by the buyer. In some instances, depending on the degree of relevancy, various actions may be taken. An alert may be pushed to the buyer's mobile device if the highest degree of relevancy is determined (e.g., system-initiated), or may be accessible if the buyer checks on a directory or available events (e.g., buyer-initiated). In some instances, information about the event may be conveyed via phone call, text, e-mail, app-alert, or any other technique. In some instances, the buyer may be able to specify the desired degree of relevancy for the various types of alerts. The system can be owned and/or operated by a single entity.

In some cases, the merchant and/or buyer information can be stored in a memory location of the system. Accordingly, relevance ranking may be a function of both buyer and merchant information. For instance, a merchant or event may intend to target buyers of a given age group or other demographic. In some cases, a search for merchants/events by a buyer can provide merchants or events having merchants that consider the buyer to be relevant to the merchants.

Systems and methods described herein may advantageously determine when an event is taking place and alert potential buyers. By determining whether the event is taking place based on information from merchant devices, the systems and methods described herein do not require pre-registration or separate event planning. This may permit buyers to find out about events that may occur organically or spontaneously. Buyers, who may not have seen promotional materials relating to a planned event, may also find out about events. Furthermore, buyers may be notified about events based on relevance to the buyer. This may allow the events to attract buyers who would most likely be interested in the event and likely to purchase items. Event guides may help direct buyers to the merchants or areas where the buyer is most likely to make a purchase. Formulation of event guides on the fly may reduce manual workload that may occur in traditional systems where manpower is spent creating a static guide for an event. Event guides that are formulated based on merchant device information may also permit up-to-date information to be disseminated to the buyers and merchants. Both merchants and buyers may benefit from this event determination and notification.

It should be understood from the foregoing that, while particular implementations have been illustrated and described, various modifications can be made thereto and are contemplated herein. It is also not intended that the invention be limited by the specific examples provided within the specification. The descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for alerting a user about a location-based event, comprising:
   receiving, via a communication network, data from merchant devices associated with respective merchants, wherein the data includes location-based information of the merchant devices and transaction-based information of the respective merchants;
   detecting, by a processor, a location-based event where a group of the respective merchants convene at a geographical location to offer products for sale, the detection of the location-based event being based on at least (1) a first proximity factor indicating that the group of merchants are within a first geofence around the geographical location and (2) a number of transactions conducted by the group of merchants over a period of time exceeding a threshold, the first proximity factor and the number of transactions being derived from the location-based information and the transaction-based information, respectively;
   determining that the location-based event is relevant to the user associated with a mobile device based at least in part on at least one of:
      a second proximity factor indicating that the mobile device is within a second geofence of the location-based event; and
      data indicating that the user previously purchased from at least one of the group of merchants or purchased at least one item related to one or more of the products offered for sale by the group of merchants;
   sending, via the communication network, a map generated from the location-based information and a signal to the mobile device, the map showing the location of the user in relation to the group of merchants over time, the signal causing an application executing on the mobile device to display information about the location-based event and the map.

2. The method of claim 1, wherein the information about the location-based event includes an event guide that includes a list of merchants in the group participating in the location-based event.

3. A method, comprising:
   receiving, via a communication network, location-based information and transaction-based information from merchant devices associated with respective merchants;
   detecting, by a processor and based at least in part on the location-based information and the transaction-based information, that a group of the respective merchants are in a first geographical proximity of each other and have engaged in one or more transactions to offer products for sale via corresponding ones of the merchant devices;
   based on the detection of the group of merchants in proximity of each other and the one or more transactions, determining, by the processor, that the group of merchants are participating in a location-based event; and
   sending a signal to a mobile device based at least in part on a second geographical proximity of the mobile device to the location-based event, the second geographical proximity determined from at least global positioning system (GPS) data indicating that a user associated with the mobile device is traveling toward the location-based event, the signal causing an application executing on the mobile device to display information associated with the location-based event.

4. The method of claim 3, wherein determining that the group of merchants are participating in the location-based event includes determining that a number merchants of the group within the first geographical proximity of each other exceeds a threshold.

5. The method of claim 3, further comprising:
   determining, by the processor, a type of the location-based event based at least in part on the location-based information and the transaction-based information.

6. The method of claim 5, further comprising determining the type of the location-based event based at least in part on at least one types of the products offered by the group of merchants for sale.

7. The method of claim 5, wherein the type of the location-based event is one or more of a farmer's market, a fair, a food truck gathering, a carnival, a trade show, a mall, a neighborhood garage sale, a flea market, a charity event, or a convention.

8. The method of claim 3, wherein the transaction-based information includes identifying information corresponding to the products offered for sale by the group of merchants.

9. The method of claim 3, wherein the merchant devices include a payment reading mechanism.

10. The method of claim 9, wherein the payment reading mechanism includes a card reader.

11. The method of claim 9, wherein the payment reading mechanism includes a communication unit that receives data from the mobile device.

12. The method of claim 3, wherein sending the signal to the mobile device is based on past purchases by the user.

13. The method of claim 3, wherein the information associated with the location-based event includes a guide configured to assist the user with navigating the location-based event.

14. The method of claim 3, wherein the information associated with the location-based even includes promotions offering discounts or sales associated with one or more merchants of the group or suggestions of merchants at the location-based event for the user to visit based on the user's past purchases.

15. A non-transitory computer readable medium having computer-executable instructions that, when executed by one or more processors, cause the one or more processors to:
detect that merchants are participating in an event based at least in part on geographical proximity of point of sale devices associated with the merchants and one or more transactions being conducted via one or more of the point of sales devices within a period of time, the merchants offering one or more items for purchase at the event;
generate an interactive event guide configured to assist a user with navigating the event, the event guide generated based at least in part on location-based information associated with the merchants indicative of locations of the merchants relative to each other at the event and transaction-based information associated with one or more sales of items at one or more of the point of sales devices; and
send a signal to a mobile device associated with the user, the signal causing an application on the mobile device to display the event guide.

16. The non-transitory computer readable medium of claim 15, wherein the non-transitory computer readable medium has computer-executable instructions that, when executed by one or more processors, cause the one or more processors to generate a map of the event based on the location-based information received from the merchants.

17. The non-transitory computer readable medium of claim 15, wherein the non-transitory computer readable medium has computer-executable instructions that, when executed by one or more processors, cause the one or more processors to generate a directory of the merchants at the event, the directory comprising at least one of information about the merchants, contact information of the merchants, information about items offered for sale by the merchants at the event, wait times associated with one of preparation and acquiring of the items, offers, or promotions.

18. The non-transitory computer readable medium of claim 15, wherein the non-transitory computer readable medium has computer-executable instructions that, when executed by one or more processors, cause the one or more processors to generate the event guide without requiring pre-registration by the merchants.

19. A system, comprising:
a communication interface configured to receive, from merchant devices associated with respective merchants, location-based information and transaction-based information; and
non-transitory computer readable medium having computer-executable instructions that, when executed by one or more processors, cause the one or more processors to:
determine that the respective merchants are participating in a location-based event by using the location-based information and transaction-based information, the location-based event being an event during which a group of the respective merchants offer products for sale, determining of the location based event including (1) detecting that the group of the respective merchants are within a first geofence of a geographical location and (2) merchants of the group have conducted a threshold number of transactions; and
send, based at least in part on a location of a mobile device of a user being within a second geofence of the location-based event, a signal to the mobile device of the user to activate an application for displaying information associated with the location-based event.

20. The system of claim 19, wherein the non-transitory computer readable medium has computer-executable instructions that, when executed by one or more processors, cause the one or more processors to determine a type of the location-based event based at least in part on the location-based information and the transaction-based information.

21. The system of claim 19, wherein the non-transitory computer readable medium has computer-executable instructions that, when executed by one or more processors, cause the one or more processors to generate an event guide configured to assist the user with navigating the location-based event based at least in part on the location-based information and the transaction-based information.

22. The method of claim 1, wherein determining that the information about the location-based event is relevant to the user is based at least in part on a direction that the user is traveling.

23. The method of claim 1, wherein determining that the information about the location-based event is relevant to the user is based at least in part on data indicating that the user has visited a location of the location-based event or one or more locations within a threshold distance of the location of the location-based event.

24. The method of claim 1, wherein sending the signal to the mobile device is based at least in part on a determination that the user can travel to the location-based event before expiration of a time period after which the location-based event is terminated.

25. The method of claim 1, wherein
the detecting the location-based event is further based on a number of merchants in the group, and
the location based event is time limited.

26. The method of claim 3, wherein the detecting the location-based event is further based on a number of the one or more transactions that the group of merchants have engaged in over a period of time, and items sold by the respective merchants.

27. The non-transitory computer-readable medium of claim 15, wherein the non-transitory computer readable medium has computer-executable instructions that, when executed by one or more processors, cause the one or more processors to further detect that the merchants are participating in the event based on (1) a number of the merchants in the group, (2) items sold by the merchants and (3) a number of the one or more transactions conducted within the period of time.

28. The system of claim 19, wherein the non-transitory computer readable medium has computer-executable instructions that, when executed by one or more processors, cause the one or more processors to further determine the location-based event based on (1) a number of merchants in the subset and (2) items sold by the respective merchants.

* * * * *